(12) United States Patent
Poojar et al.

(10) Patent No.: US 12,017,791 B2
(45) Date of Patent: Jun. 25, 2024

(54) SYSTEM AND METHOD FOR INTERPRETING GESTURES AND PROVIDING CONTROL SIGNALS

(71) Applicant: Rockwell Collins, Inc., Cedar Rapids, IA (US)

(72) Inventors: Shivarajkumar Poojar, Bangalore (IN); Divakara Rao Vadada, Bangalore (IN); Smita Naik, Sunkeri (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 275 days.

(21) Appl. No.: 17/087,939

(22) Filed: Nov. 3, 2020

(65) Prior Publication Data

US 2022/0063832 A1 Mar. 3, 2022

(30) Foreign Application Priority Data

Sep. 3, 2020 (IN) .............................. 202041038031

(51) Int. Cl.
*B64D 43/00* (2006.01)
*B64D 47/08* (2006.01)
(Continued)

(52) U.S. Cl.
CPC ............. *B64D 43/00* (2013.01); *B64D 47/08* (2013.01); *B64F 1/18* (2013.01); *G06F 3/017* (2013.01);
(Continued)

(58) Field of Classification Search
CPC ......... B64D 43/00; B64D 47/08; B64F 1/002; B64F 1/18; B64F 1/22; G08G 5/00; G06F 3/017; H04N 1/00381; G06T 7/20
(Continued)

(56) References Cited

U.S. PATENT DOCUMENTS 8,456,329 B1 * 6/2013 Tran ....................... G08C 17/02
362/186
8,615,108 B1 12/2013 Stoppa et al.
(Continued)

FOREIGN PATENT DOCUMENTS

EP 2615523 A1 7/2013
EP 3597545 A1 1/2020
(Continued)

OTHER PUBLICATIONS

Extended Search Report in European Application No. 21193915.2 dated Jan. 31, 2022.
(Continued)

*Primary Examiner* — Adam D Tissot
*Assistant Examiner* — Aaron K McCullers
(74) *Attorney, Agent, or Firm* — Suiter Swantz IP (57) ABSTRACT

A system is disclosed, in accordance with one or more embodiments of the present disclosure. In one embodiment, the system includes a plurality of image capture devices, a controller communicatively coupled to the plurality of image capture devices, wherein the controller includes one or more processors configured to receive a plurality of reference images including one or more source objects, identify the one or more source objects, determine one or more gestures indicative of one or more control signals of the one or more source objects, determine the one or more control signals; and provide the one or more control signals.

7 Claims, 10 Drawing Sheets

(51) Int. Cl.
  *B64F 1/18*    (2006.01)
  *G06F 3/01*    (2006.01)
  *G06T 7/20*    (2017.01)
  *G06V 40/20*   (2022.01)
  *G08G 5/06*    (2006.01)
  *B64F 1/00*    (2024.01)
  *B64F 1/22*    (2024.01)

(52) U.S. Cl.
  CPC ............... *G06T 7/20* (2013.01); *G06V 40/28* (2022.01); *G08G 5/065* (2013.01); *B64F 1/002* (2013.01); *B64F 1/22* (2013.01)

(58) Field of Classification Search
  USPC ........................................................... 701/3
  See application file for complete search history.

(56) References Cited

U.S. PATENT DOCUMENTS

| | | |
|---|---|---|
| 9,390,726 B1 | 7/2016 | Smus et al. |
| 10,507,917 B2 | 12/2019 | Taylor et al. |
| 10,559,213 B2 | 2/2020 | Ell et al. |
| 2010/0013944 A1* | 1/2010 | Venetsky ............... G06V 40/28 |
| | | 382/209 |
| 2010/0235034 A1* | 9/2010 | Higgins ................. G06F 3/017 |
| | | 701/28 |
| 2014/0211991 A1 | 7/2014 | Stoppa et al. |
| 2015/0016093 A1* | 1/2015 | Wilson ................ F21V 33/0008 |
| | | 362/103 |
| 2016/0349845 A1 | 12/2016 | Poupyrev et al. |
| 2017/0180336 A1* | 6/2017 | Josephson ............... G06F 21/32 |
| 2018/0032144 A1* | 2/2018 | Horowitz ................. G01S 3/00 |
| 2018/0251219 A1* | 9/2018 | Taylor .................... G06V 20/17 |
| 2019/0295274 A1 | 9/2019 | Rutkiewicz |
| 2020/0103980 A1* | 4/2020 | Katz ..................... G06F 3/0484 |

FOREIGN PATENT DOCUMENTS

| | | |
|---|---|---|
| KR | 20130043222 A | 4/2013 |
| WO | 2018145650 A1 | 8/2018 |

OTHER PUBLICATIONS

Civil Aviation Authority, CAP 637, "Visual Aids Handbook", First Issued Jan. 1997, Issue 2, May 2007, ISBN-13 978 0 11790 844 4, 68 pages.

* cited by examiner

SYSTEM AND METHOD FOR INTERPRETING GESTURES AND PROVIDING CONTROL SIGNALS

CROSS-REFERENCE TO RELATED APPLICATION

The present application claims the benefit of India Provisional Patent Application No. 202041038031, filed Sep. 3, 2020, entitled SYSTEM AND METHOD FOR INTERPRETING GESTURES AND PROVIDING CONTROL SIGNALS, naming SHIVARAJKUMAR POOJAR and DIVAKARA RAO VADADA as inventors, which is incorporated herein by reference in the entirety

TECHNICAL FIELD

The present invention generally relates to gesture interpretation, and, more particularly, interpretation of aircraft ground marshaller hand gestures.

BACKGROUND

Certain activities, such as passenger on-boarding and off-boarding, cargo loading, refueling, typically occur when an aircraft is parked in designated places where the safety and security of the environment is assured, including, without limitation, an airport ramp, a tarmac, and/or an apron. In order for the aircraft to be parked in such places, it is vital that the aircraft be maneuvered such that it avoids obstacles. Some airports have automated guidance systems (e.g., stand entry guidance systems), which are configured to provide one or more indications (e.g., visual indicators) to aircraft crew such that the crew may safely park the aircraft. Most airports employ ground crew personnel (e.g., ramp agents, ground mashallers, wing walkers) to provide visual hand gestures to the aircraft crew, where the visual hand gestures correspond to an action defined and described in ramp agent standard operating procedures (e.g., visual aid handbooks published or produced by public or private entities) to be taken by the crew with respect to maneuvering the aircraft. Occasionally, the ground crew personnel may provide an improper hand gesture, or the aircraft crew may incorrectly interpret a hand gesture of the ground crew. In these situations, hazardous and undesirable outcomes may result, and damage to the aircraft, airport, and/or people—sometimes severe—may occur.

Therefore, it would be desirable to provide a system and method which cure one or more of the shortfalls of the previous approaches identified above.

SUMMARY

A system is disclosed, in accordance with one or more embodiments of the present disclosure. In one embodiment, the system includes a plurality of image capture devices, a controller communicatively coupled to the plurality of image capture devices, wherein the controller includes one or more processors configured to execute a set of program instructions stored in one or more memory units, the set of program instructions configured to cause the one or more processors to: receive a plurality of reference images, wherein the plurality of reference images includes one or more source objects; identify the one or more source objects within the plurality of reference images; determine one or more gestures of the one or more source objects, wherein the one or more gestures are indicative of one or more control signals of the one or more source objects; determine the one or more control signals based on the one or more gestures of the one or more source objects; and provide the one or more control signals.

A method is disclosed, in accordance with one or more embodiments of the present disclosure. In one embodiment, the method includes receiving a plurality of reference images, wherein the plurality of reference images includes one or more source objects. In another embodiment, the method includes identifying the one or more source objects within the plurality of reference images. In another embodiment, the method includes determining one or more gestures of the one or more source objects, wherein the one or more gestures are indicative of one or more control signals of the one or more source objects. In another embodiment, the method includes determining the one or more control signals based on the one or more gestures of the one or more source objects. In another embodiment, the method includes providing the one or more control signals.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Manually guiding an aircraft to its parking position requires constant visual contact and conscious diligence by both aircraft crew and ground crew in order to avoid obstacles. Certain situations may lead to hazardous outcomes, and may result in substantial damage to aircraft, ground vehicles, persons, and the like. For example, improper guidance or gesturing provided by a ground crew may cause the aircraft crew to take improper action. By way of another example, misinterpretation of a proper guidance or gesture by an aircraft crew may cause the aircraft crew to take improper action. In some cases, there may be multiple ground crew personnel providing gestures and/or guidance to the aircraft crew. In those situations, contradicting gestures and/or guidance between two or more of the ground crew personnel may cause the aircraft crew to rely take improper action. Other factors, such as visibility of the ground crew, may affect the ability of the aircraft crew to receive accurate signals.

Reference will now be made in detail to the subject matter disclosed, which is illustrated in the accompanying drawings.

Referring generally to FIGS. 1A-3E, a system and method for interpreting gestures is disclosed, in accordance with one or more embodiments of the present disclosure.

Figure 1A:
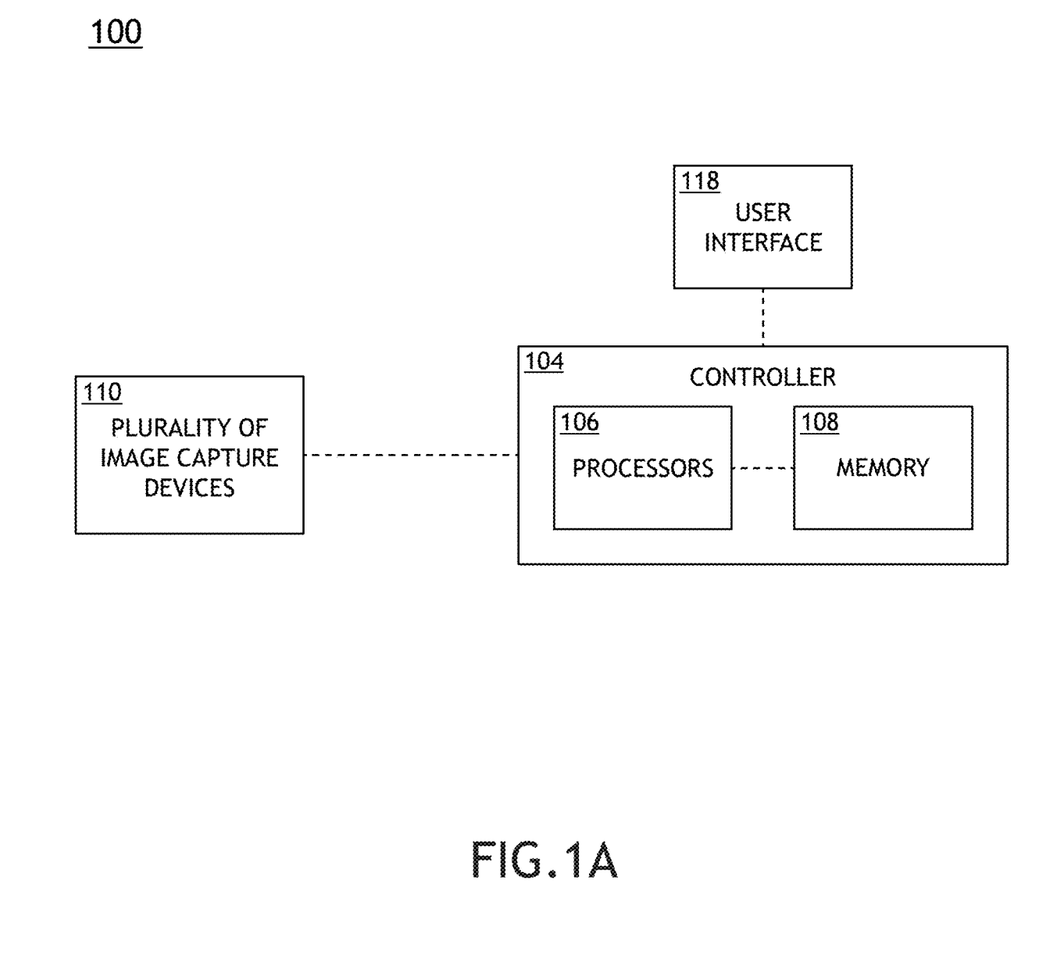
FIG. 1A illustrates a simplified block diagram of a system for interpreting gestures, in accordance with one or more embodiments of the present disclosure.

FIG. 1A illustrates a simplified block diagram of a system 100 for interpreting gestures, in accordance with one or more embodiments of the present disclosure. The system 100 may include, but is not limited to, a plurality of image capture devices 110, a controller 104, and a user interface 118. The controller 104 may include one or more processors 106, and memory 108. The system 100 may be communicatively coupled to a remote server (e.g., via a network) (not shown). The components of the system 100 may be communicatively coupled to one or more other components of the system 100. For example, the components of the system 100 may be communicatively coupled using any wired or wireless communication technique known in the art including, but not limited to, ZigBee, SigFox, NB-IOT, radio frequency (RF) protocols, Bluetooth protocols, GSM, GPRS, DCMA, EV-DO, EDGE, WiMAX, 4G, 4G LTE, 5G, 6G, WiFi protocols, RF, LoRa, and the like. For purposes of the present disclosure, the system 100 may be communicatively coupled to a remote server via any series of communicative connections, including, without limitation, one or more data gateways configured to communicatively couple the system 100 to a network.

It is contemplated herein that the remote server may comprise a remote server configured to carry out one or more of the steps of the present disclosure. In one embodiment, the remote server may be configured to store received data in memory. The one or more processors 106 may be further configured to execute a set of program instructions stored in memory, the program instructions configured to cause the one or more processors 106 to carry out one or more steps of the present disclosure.

In one embodiment, system 100 may include a user interface 118 communicatively coupled to the controller 104. In one embodiment, the user interface 118 includes a display used to display data of the system 100 to a user. The display of the user interface 118 may include any display known in the art. For example, the display may include, but is not limited to, a liquid crystal display (LCD), an organic light-emitting diode (OLED) based display, or a CRT display. Those skilled in the art should recognize that any display device capable of integration with a user interface is suitable for implementation in the present disclosure. In another embodiment, a user may input selections and/or instructions responsive to data displayed to the user via the user interface.

In another embodiment, the user interface 118 may include, but is not limited to, one or more desktops, laptops, tablets, smartphones, smart watches, avionics displays, or the like. In one embodiment, a user may use the user interface in order to view data collected by the system 100, generated by the one or more processors 106, or stored in memory 108. In another embodiment, the user interface may be configured to receive one or more input commands from a user, wherein the one or more input commands are configured to cause the one or more processors 106 to adjust one or more characteristics of the system 100. In some embodiments, the user interface 118 may include one or more aural alerting systems (e.g., systems configured to provide one or more aural alerts to a user). The user interface 118 is not limited to a single interface. For example, in some embodiments, the user interface 118 may comprise a plurality of user interfaces (e.g., pilot-side and co-pilot side user interfaces).

For example, one or more processors 106 may be configured to transmit one or more alerts to a user, wherein the user interface is configured to display the one or more alerts to the user via the display. The one or more alerts generated by system 100 and displayed via display may include any alert known in the art including, without limitation, automated phone calls, text messages, emails, application notifications, banners, push notifications, and the like.

In one embodiment, the one or more processors 106 may be located in a remote server. In at least this embodiment, the one or more processors 106 located in the remote server may be configured to perform one or more processing functions of the present disclosure.

Figure 1B:
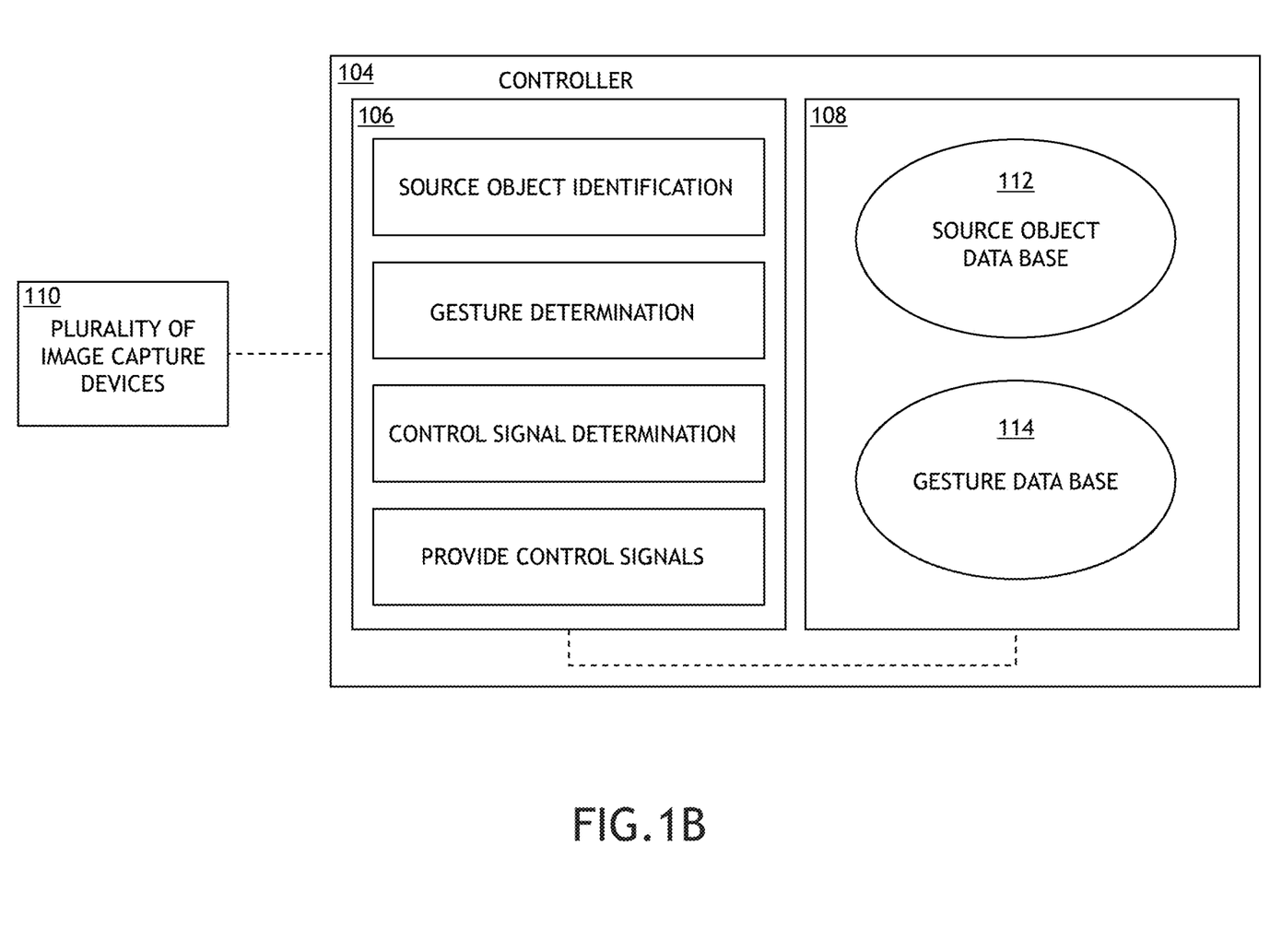
FIG. 1B illustrates a simplified block diagram of a system for interpreting gestures, in accordance with one or more embodiments of the present disclosure.

1B illustrates a simplified block diagram of a system 100 for interpreting gestures, in accordance with one or more embodiments of the present disclosure. As shown in FIG. 1B and as previously described herein, the system 100 may include, but is not limited to, a plurality of image capture devices 110, a controller 104, and a user interface 118.

The one or more processors 106 may be configured to execute a set of program instructions. In one embodiment, the set of program instructions may be configured to cause the one or more processors 106 to receive a plurality of reference images including one or more source objects. For example, the one or more processors may receive from the plurality of image capture devices 110 the plurality of reference images. The plurality of reference images may include one or more images, videos, or other visual data. For example, the plurality of reference images may include images and/or videos of an environment surrounding an aircraft in motion, including, without limitation, images and/or videos of ground crew personnel performing gestures. The plurality of reference images may comprise segmented video streams.

In another embodiment, the set of program instructions may be configured to cause the one or more processors 106 to identify the one or more source objects within the plurality of reference images. The one or more source objects may include, but are not limited to, marshallers, marshaller wands, marshaller vests, and the like. In one embodiment, the set of program instructions may be configured to cause the one or more processors 106 to parse one or more of the plurality of reference images to permit the identification of the one or more source objects by the one or more processors 106. In this way, the one or more processors 106 may be configured to identify one or more of the plurality of reference images that include the one or more source objects. In at least the foregoing example, the one or more processors 106 may be configured to identify one or more of the plurality of reference images that include the one or more source objects by determining one or more source object characteristics of the one or more source objects within the plurality of reference images. For example, the one or more source object characteristics may include one or more distances between the plurality of image capture devices 110 and the one or more source objects, one or more dimensions (e.g., height, width, length) of the one or more source objects, one or more visual characteristics of the one or more source objects (e.g., color of a marshaller vest, color of marshaller wands, or the like), or one or more movements of the one or more source objects. In at least some embodiments, the one or more processors 106 may be configured to disregard one or more of the plurality of reference images that do not include the one or more source objects. In some embodiments, the one or more processors 106 may be configured to identify the one or more source objects within the plurality of reference images by determining whether the plurality of reference images include the one or more source object characteristics. For example, the one or more processors 106 may compare the plurality of reference images to one or more expected source object characteristics (e.g., distance, dimensions, visual characteristics, movement, etc.) stored in a source object database 112. By way of another example, the source object database 112 may be configured to store data regarding one or more source object characteristics such that the one or more processors 106 may determine whether the plurality of reference images include the one or more source objects by assessing whether one or more source object characteristics within the plurality of reference images match the one or more expected source object characteristics within a predefined threshold. The source object database 112 may be stored in the memory 108, and may be communicatively coupled to the one or more processors 106.

In another embodiment, the set of program instructions may be configured to cause the one or more processors 106 to determine one or more gestures of the one or more source objects. For example, the one or more processors 106 may determine one or gestures being performed by the ground crew personnel at the time the plurality of reference images were captured. The one or more gestures of the one or more source objects may be indicative of one or more control signals. For example, the one or more gestures may provide one or more visual signals to one or more operators of an aircraft (e.g., aircraft crew, ground crew, or the like) to adjust one or more aspects of movement of an aircraft (e.g., acceleration of the aircraft, direction of movement of the aircraft, starting of one or more engines, stopping of one or more engines, braking of the aircraft, parking of the aircraft, or the like). In some embodiments, the one or more processors 106 may be configured to determine the one or more gestures of the one or more source objects within the plurality of reference images by determining whether the plurality of reference images include one or more known gesture patterns indicative of the one or more gestures. For example, the one or more processors 106 may compare the plurality of reference images to one or more expected source gesture patterns stored in a gesture database 114. By way of another example, the gesture database 114 may be configured to store data regarding one or more gestures such that the one or more processors 106 may determine whether the plurality of reference images include the one or more gestures by assessing whether one or more gesture patterns within the plurality of reference images match the one or more expected gestures within a predefined threshold. The gesture database 114 may be stored in the memory 108, and may be communicatively coupled to the one or more processors 106. In some embodiments, the gesture patterns may be converted to digital gesture sequences (see FIGS. 3A through 3F, discussed herein). The digital gesture sequences may be compared to one or more known gesture sequences stored in the gesture database 114.

In another embodiment, the one or more processors 106 may be configured to determine one or more control signals based on the one or more gestures of the one or more source objects. For example, the one or more processors 106 may be configured to determine a meaning of the one or more gestures and correlate the meaning with one or more control signals. By way of another example, the one or more processors 106 may be configured to determine the one or more control signals by comparing the one or more gestures to one or more control signal databases (not shown) stored in the memory 108. In at least the foregoing embodiment, the one or more control signals databases may be configured to correlate a gesture with a corresponding control signal for movement of one or more portions of an aircraft. The one or more control signal databases may be configured to correlate one or more gestures with widely accepted gesture conventions known in the art (e.g., Civil Aviation Authority visual aids or the like). The one or more control signals may be configured to adjust one or more aspects of movement of an aircraft (e.g., acceleration of the aircraft, direction of movement of the aircraft, starting of one or more engines, stopping of one or more engines, braking of the aircraft, parking of the aircraft, or the like).

In some embodiments, the one or more processors 106 may be configured to validate the one or more control signals determined from one or more gestures detected from multiple of the plurality of image capture devices 110. For example, the plurality of image capture devices 110 may be disposed on different portions of an aircraft (e.g., at the nose, on the wings, on one or more portions of the fuselage, on landing gear, on vertical stabilizer, on horizontal stabilizer, etc.). In this way, in some embodiments, each of the plurality of image capture devices 110 may be configured to capture reference images on different sides of or in different locations with respect to the aircraft. In order to ensure that the one or more control signals determined based on gestures captured on different sides of the aircraft are not contradictory (e.g., a right-side control signal determined based on reference images captured on a right side of the aircraft is configured to cause the aircraft to turn, where a left-side control signal determined based on reference images captured on the left side of the aircraft is configured to cause the aircraft to brake), the one or more processors 106 may be configured to compare one or more determined control signals (e.g., compare the right-side control signal to the left-side control signal) to determine one or more contradictions between the one or more determined control signals. In the event one or more contradictions are determined (or, in some embodiments, in the event the one or more determined contradictions fall outside of a pre-determined threshold), the one or more processors 106 may be configured to provide one or more control signals (e.g., control signals for braking, stopping, alerts, etc.) such that the contradictory control signals do not give rise to a hazardous condition (e.g., collision of the aircraft with one or more other objects). In such an event, the one or more processors 106 may be configured to receive an additional plurality of reference images such that one or more additional control signals may be determined until such time as no contradictions or determined (or, in some embodiments, until such time as the determined contradictions fall within a predetermined threshold).

In another embodiment, the one or more processors 106 may be configured to provide the one or more control signals. For example, the one or more processors 106 may be configured to provide the one or more control signals to at least one of a user (e.g., aircraft crew) via the user interface 118. In this regard, the user interface 118 may be configured to permit the user to perform one or more adjustments to one or more aspects of movement of an aircraft (e.g., by manually adjusting the acceleration of the aircraft, direction of movement of the aircraft, starting one or more engines, stopping one or more engines, braking the aircraft, parking the aircraft, or the like). By way of another example, the one or more processors 106 may be configured to provide one or more control signals to one or more systems of the aircraft (e.g., avionics, autopilot, flight systems, etc.) such that the one or more adjustments to one or more aspects of movement of the aircraft may be executed automatically.

Figure 1C:
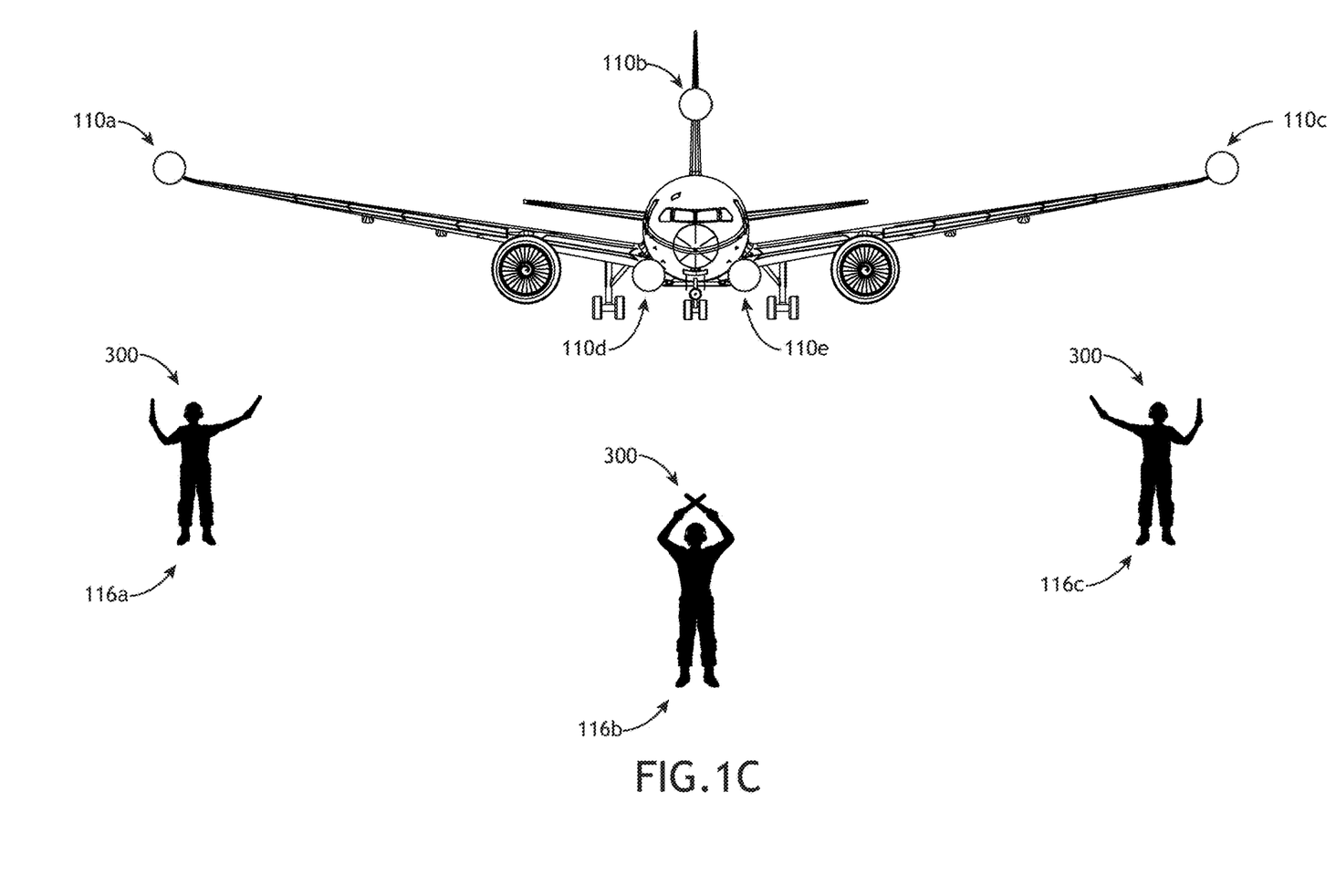
FIG. 1C illustrates a conceptual view of a system for interpreting gestures, in accordance with one or more embodiments of the present disclosure.

FIG. 1C illustrates a conceptual view of a system for interpreting gestures, in accordance with one or more embodiments of the present disclosure. As shown in FIG. 1C and as previously described herein, the system 100 may include a plurality of image capture devices 110. For example, the system 100 may include a plurality of image capture devices 110*a*-110*e* disposed on different portions of the aircraft. As previously described, the plurality of image capture devices 110 may be disposed at the nose, on the wings, on one or more portions of the fuselage, on landing gear, on vertical stabilizer, on horizontal stabilizer, etc., of the aircraft. The plurality of image capture devices 110 may include, but are not limited to camera attachments (e.g., thermal camera, photographic camera, infrared camera, activity tracking camera), thermal imaging attachments, 3D scanning/imaging device attachments, laser scanning device attachments, light sensor attachments, one or more depth sensors, or the like.

As previously described, the one or more source objects 116 may be located on different sides of and in various locations with respect to the aircraft. For example, the one or more source objects 116*a*-116*c* may include one or more ground marshallers, wing walkers, or the like, positioned in the environment around the aircraft. The one or more source objects 116*a*-116*c* may perform one or more gestures 300. For example, the one or more ground marshallers may perform one or more hand gestures intended to marshall the aircraft into a parking position. By way of another example, the one or more wing walkers may perform one or more hand gestures intended to guide ground crew personnel and/or aircraft crew.

The one or more processors 106 may include any one or more processing elements known in the art. In this sense, the one or more processors 106 may include any microprocessor-type device configured to execute software algorithms and/or instructions. In one embodiment, the one or more processors 106 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 106. In general, the term "processor" may be broadly defined to encompass any device having one or more processing elements, which execute program instructions from memory. Moreover, different subsystems of the system 100 may include processor or logic elements suitable for carrying out at least a portion of the steps described throughout the present disclosure. Therefore, the above description should not be interpreted as a limitation on the present disclosure but merely an illustration.

It is noted that various components of the system 100 may include one or more network components (e.g., server, the data gateway, network interface, and the like) (not shown) configured to communicatively couple the various components to a network. The one or more network components may include any network interface circuitry or network interface device suitable for interfacing with the network. For example, the network interface circuitry may include wireline-based interface devices (e.g., DSL-based interconnection, cable-based interconnection, T9-based interconnection, and the like). In another embodiment, the network interface circuitry may include a wireless-based interface device employing GSM, GPRS, CDMA, EV-DO, EDGE, WiMAX, 3G, 4G, 4G LTE, 5G, 6G, WiFi protocols, RF, LoRa, and the like.

Figure 2:
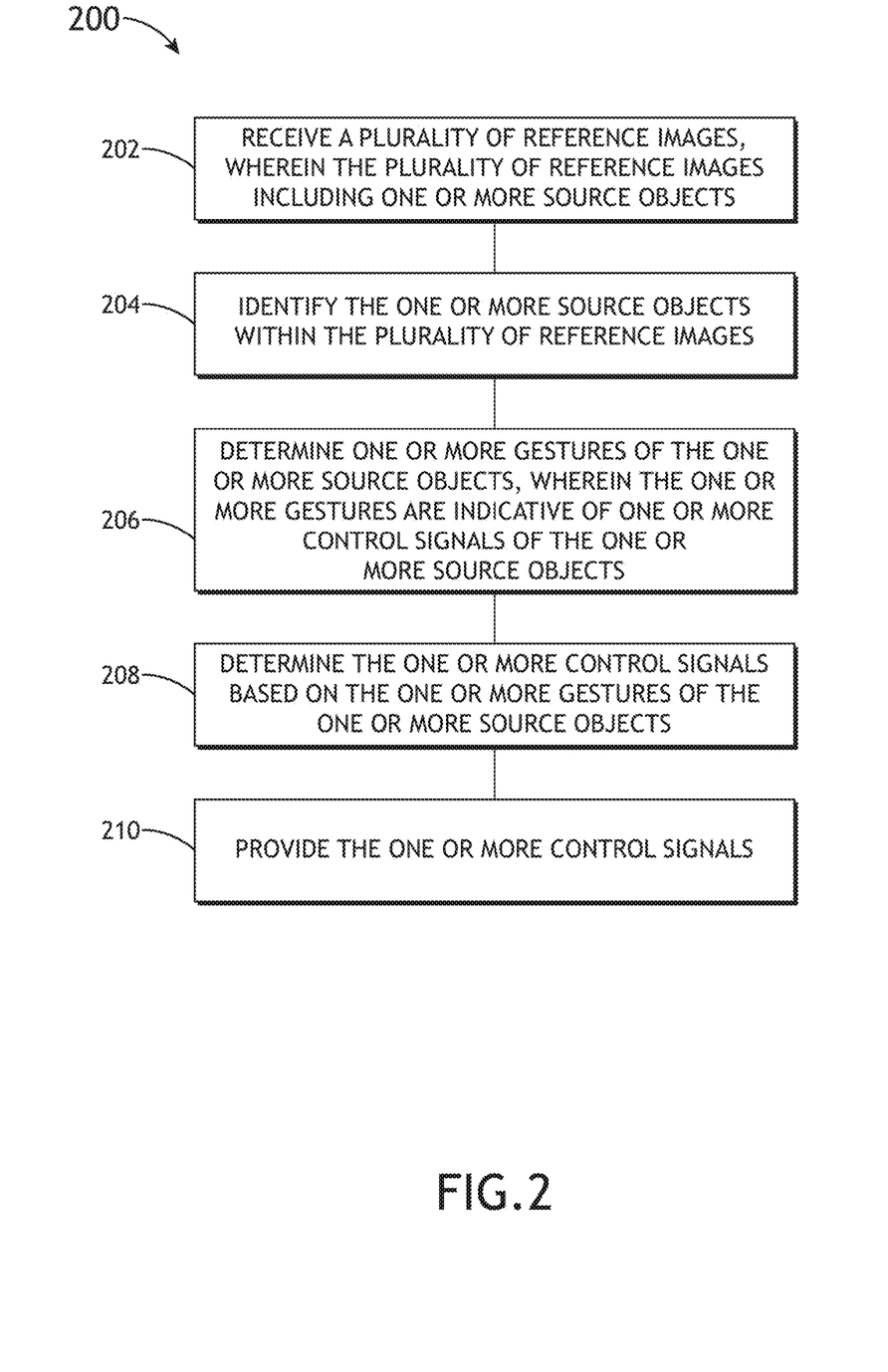
FIG. 2 is a process flow diagram illustrating the steps of a method of interpreting gestures, in accordance with one or more embodiments of the present disclosure.

FIG. 2 is a process flow diagram illustrating the steps of a method 200 of interpreting gestures, in accordance with one or more embodiments of the present disclosure In Step 202, a plurality of reference images is received, wherein the plurality of reference images include one or more source objects. For example, the one or more processors may receive from the plurality of image capture devices 110 the plurality of reference images. The plurality of reference images may include one or more images, videos, or other visual data. For example, the plurality of reference images may include images and/or videos of an environment surrounding an aircraft in motion, including, without limitation, images and/or videos of ground crew personnel performing gestures. The one or more source objects may include, but are not limited to, marshallers, marshaller wands, marshaller vests, and the like.

In Step 204, one or more source objects within the plurality of reference images are identified. For example, the one or more processors 106 may be configured to identify the one or more source objects within the plurality of reference images. By way of another example, the one or more processors 106 may be configured to identify one or more of the plurality of reference images that include the one or more source objects. In at least the foregoing example, the one or more processors 106 may be configured to identify one or more of the plurality of reference images that include the one or more source objects by determining one or more source object characteristics of the one or more source objects within the plurality of reference images. For example, the one or more source object characteristics may include one or more distances between the plurality of image capture devices 110 and the one or more source objects, one or more dimensions (e.g., height, width, length) of the one or more source objects, one or more visual characteristics of the one or more source objects (e.g., color of a marshaller vest, color of marshaller wands, or the like), or one or more movements of the one or more source objects. In at least some embodiments, the one or more processors 106 may be configured to disregard one or more of the plurality of reference images that do not include and/or lack the one or more source objects. In some embodiments, the one or more processors 106 may be configured to identify the one or more source objects within the plurality of reference images by determining whether the plurality of reference images include the one or more source object characteristics. For example, the one or more processors 106 may compare the plurality of reference images to one or more expected source object characteristics (e.g., distance, dimensions, visual characteristics, movement, etc.) stored in the source object database 112. By way of another example, the source object database 112 may be configured to store data regarding one or more source object characteristics such that the one or more processors 106 may determine whether the plurality of reference images include the one or more source objects by assessing whether one or more source object characteristics within the plurality of reference images match the one or more expected source object characteristics within a pre-defined threshold.

In Step 206, one or more gestures of the one or more source objects are determined, where the one or more gestures are indicative of one or more control signals. For example, the one or more processors 106 may determine one or gestures being performed by the ground crew personnel at the time the plurality of reference images were captured. The one or more gestures of the one or more source objects may be indicative of one or more control signals. For example, the one or more gestures may provide one or more visual signals to one or more operators of an aircraft (e.g., aircraft crew, ground crew, or the like) to adjust one or more aspects of movement of an aircraft (e.g., acceleration of the aircraft, direction of movement of the aircraft, starting of one or more engines, stopping of one or more engines, braking of the aircraft, parking of the aircraft, or the like). In some embodiments, the one or more processors 106 may be configured to determine the one or more gestures of the one or more source objects within the plurality of reference images by determining whether the plurality of reference images include one or more known gesture patterns indicative of the one or more gestures. For example, the one or more processors 106 may compare the plurality of reference images to one or more expected source gesture patterns stored in the gesture database 114. By way of another example, the gesture database 114 may be configured to store data regarding one or more gestures such that the one or more processors 106 may determine whether the plurality of reference images include the one or more gestures by assessing whether one or more gesture patterns within the plurality of reference images match the one or more expected gestures within a predefined threshold. The gesture database 114 may be stored in the memory 108, and may be communicatively coupled to the one or more processors 106. In some embodiments, the gesture patterns may be converted to digital gesture sequences (see FIGS. 3A through 3F, discussed herein). The digital gesture sequences may be compared to one or more known gesture sequences stored in the gesture database 114.

In Step 208, the one or more control signals are determined based on the one or more gestures of the one or more source objects. For example, the one or more processors 106 may be configured to determine a meaning of the one or more gestures and correlate the meaning with one or more control signals. By way of another example, the one or more processors 106 may be configured to determine the one or more control signals by comparing the one or more gestures to one or more control signal databases (not shown) stored in the memory 108. In at least the foregoing embodiment, the one or more control signals databases may be configured to correlate a gesture with a corresponding control signal for movement of one or more portions of an aircraft. The one or more control signal databases may be configured to correlate one or more gestures with widely accepted gesture conventions known in the art (e.g., Civil Aviation Authority visual aids or the like). The one or more control signals may be configured to adjust one or more aspects of movement of an aircraft (e.g., acceleration of the aircraft, direction of movement of the aircraft, starting of one or more engines, stopping of one or more engines, braking of the aircraft, parking of the aircraft, or the like).

In some embodiments, the determining the one or more control signals may include validating the one or more control signals. For example, the plurality of image capture devices 110 may be disposed on different portions of an aircraft (e.g., at the nose, on the wings, on one or more portions of the fuselage, on landing gear, on vertical stabilizer, on horizontal stabilizer, etc.). In this way, in some embodiments, each of the plurality of image capture devices 110 may be configured to capture reference images on different sides of or in different locations with respect to the aircraft. In order to ensure that the one or more control signals determined based on gestures captured on different sides of the aircraft are not contradictory (e.g., a right-side control signal determined based on reference images captured on a right side of the aircraft is configured to cause the aircraft to turn, where a left-side control signal determined based on reference images captured on the left side of the aircraft is configured to cause the aircraft to brake), the one or more processors 106 may be configured to compare one or more determined control signals (e.g., compare the right-side control signal to the left-side control signal) to determine one or more contradictions between the one or more determined control signals. In the event one or more contradictions are determined (or, in some embodiments, in the event the one or more determined contradictions fall outside of a pre-determined threshold), the one or more processors 106 may be configured to provide one or more control signals (e.g., control signals for braking, stopping, alerts, etc.) such that the contradictory control signals do not give rise to a hazardous condition (e.g., collision of the aircraft with one or more other objects). In such an event, the one or more processors 106 may be configured to receive an additional plurality of reference images such that one or more additional control signals may be determined until such time as no contradictions or determined (or, in some embodiments, until such time as the determined contradictions fall within a pre-determined threshold).

In Step 210, the one or more control signals are provided. For example, the one or more processors 106 may be configured to provide the one or more control signals to at least one of a user (e.g., aircraft crew) via the user interface 118. In this regard, the user interface 118 may be configured to permit the user to perform one or more adjustments to one or more aspects of movement of an aircraft (e.g., by manually adjusting the acceleration of the aircraft, direction of movement of the aircraft, starting one or more engines, stopping one or more engines, braking the aircraft, parking the aircraft, or the like). By way of another example, the one or more processors 106 may be configured to provide one or more control signals to one or more systems of the aircraft (e.g., avionics, autopilot, flight systems, etc.) such that the one or more adjustments to one or more aspects of movement of the aircraft may be executed automatically.

Figure 3A:
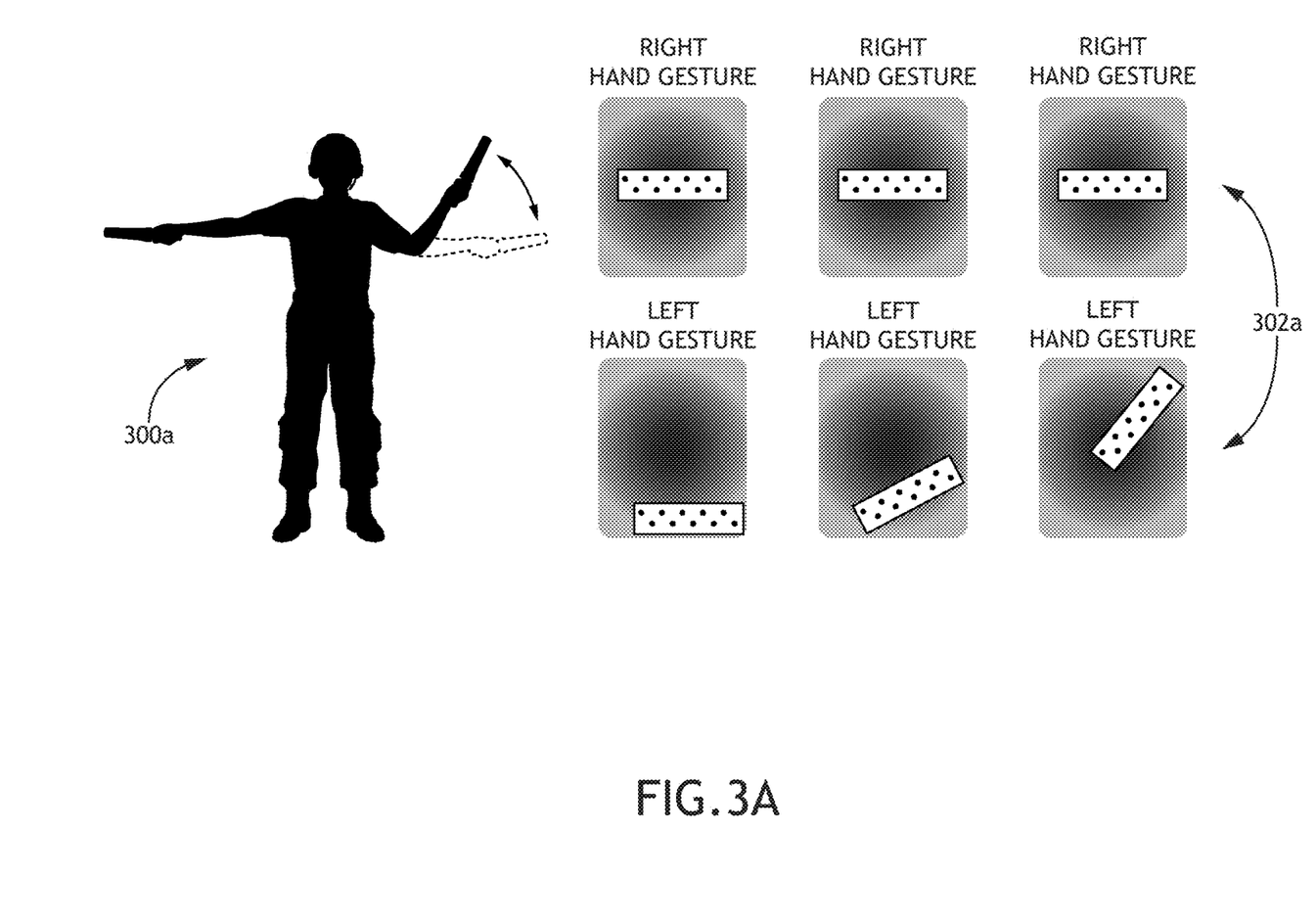
FIG. 3A illustrates a conceptual view of a hand gesture, in accordance with one or more embodiments of the present disclosure.

FIGS. 3A-3E 3A illustrate conceptual views of a hand gesture, in accordance with one or more embodiments of the present disclosure. Referring to FIG. 3A, a gesture having a meaning to turn left quickly is shown. The one or more source objects 116 may perform the one or more gestures 300a. The one or more processors 106 may be configured to determine the one or more gestures 300a of the one or more source objects within the plurality of reference images by determining whether the plurality of reference images include one or more known gesture patterns 302a indicative of the one or more gestures 300a. As shown in FIG. 3A, the one or more processors 106 may be configured to generate one or more digital gesture sequences. For example, the one or more digital gesture sequences may correspond to the movement of one or more portions of the one or more source objects. In this way, as shown in FIG. 3A, the one or more processors may be configured to generate a digital gesture sequence corresponding to a right arm extended at a 90-degree angle to a body of the source object 116, where a left hand of the body performs a signal to move forward. The digital gesture sequence may be configured to indicate a velocity of movement of the one or more source objects 116.

Figure 3B:
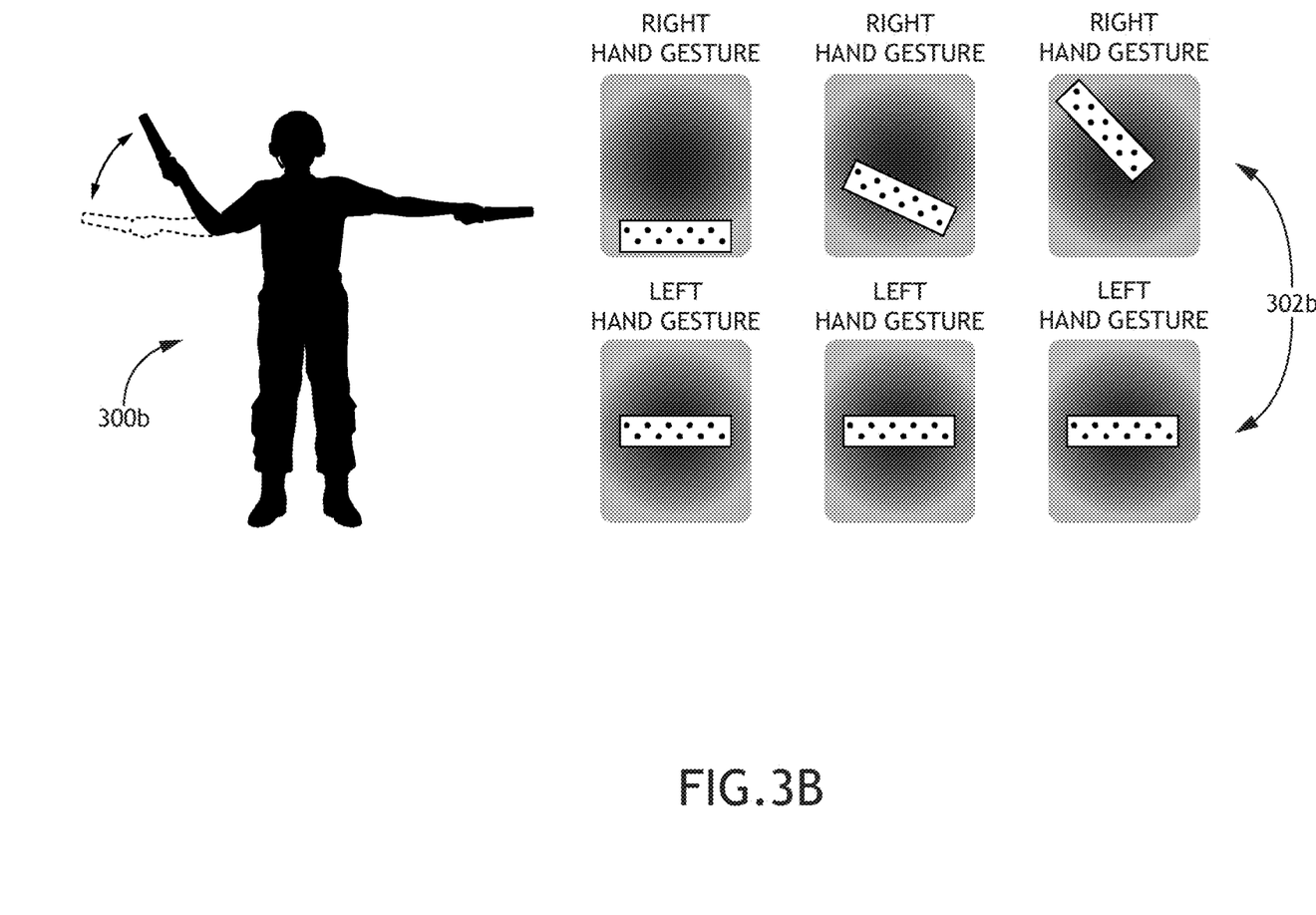
FIG. 3B illustrates a conceptual view of a hand gesture, in accordance with one or more embodiments of the present disclosure.

Referring to FIG. 3B, a gesture having a meaning to turn right quickly is shown. The one or more source objects 116 may perform the one or more gestures 300b. The one or more processors 106 may be configured to determine the one or more gestures 300b of the one or more source objects within the plurality of reference images by determining whether the plurality of reference images include one or more known gesture patterns 302b indicative of the one or more gestures 300b. As shown in FIG. 3B, the one or more processors 106 may be configured to generate one or more digital gesture sequences. For example, the one or more digital gesture sequences may correspond to the movement of one or more portions of the one or more source objects. In this way, as shown in FIG. 3B, the one or more processors may be configured to generate a digital gesture sequence corresponding to a left arm extended at a 90-degree angle to a body of the source object 116, where a right hand of the body performs a signal to move forward. The digital gesture sequence may be configured to indicate a velocity of movement of the one or more source objects 116.

Figure 3C:
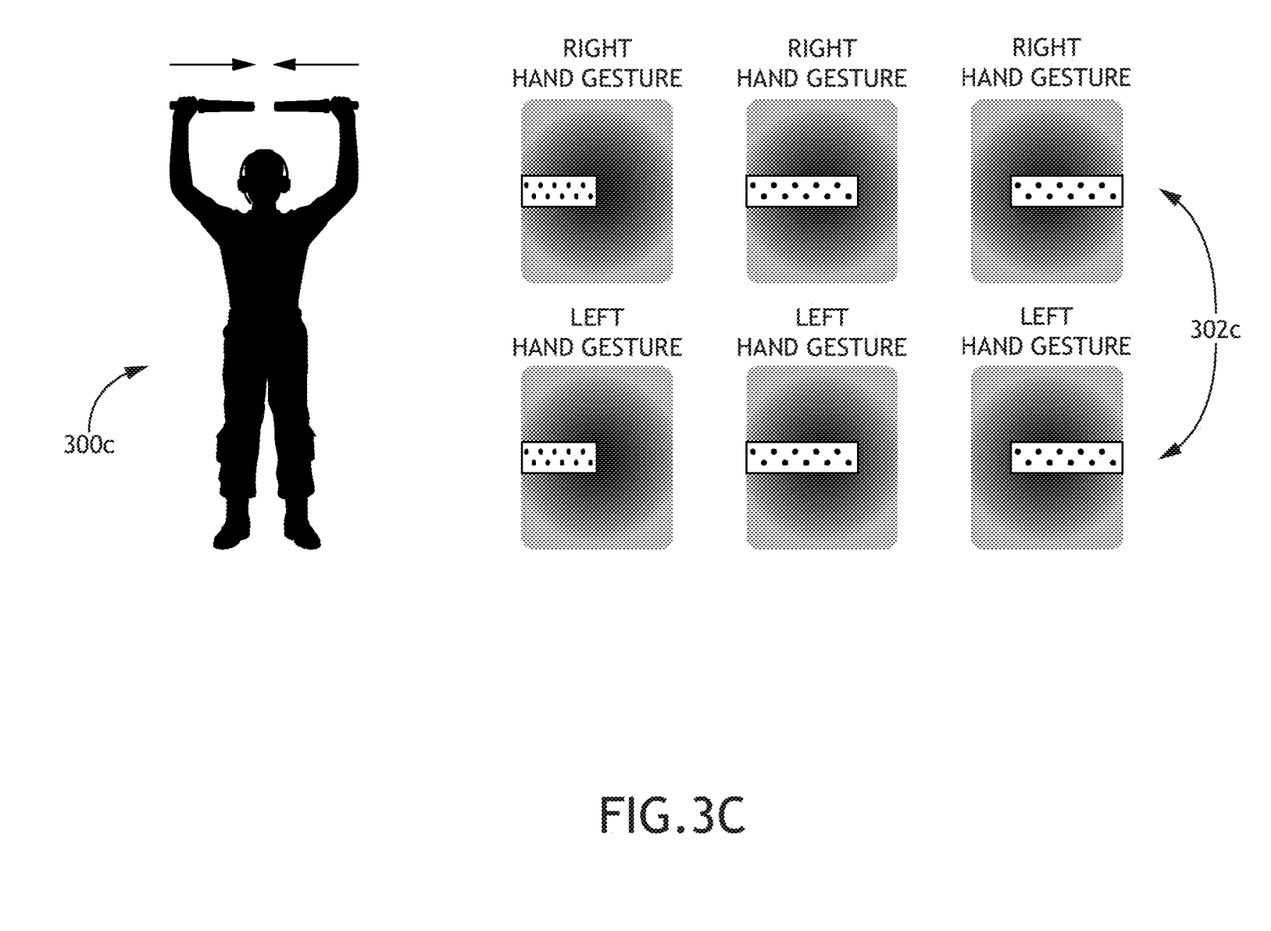
FIG. 3C illustrates a conceptual view of a hand gesture, in accordance with one or more embodiments of the present disclosure.

Referring to FIG. 3C, a gesture having a meaning that one or more aircraft wheel chokes have been inserted. The one or more source objects 116 may perform the one or more gestures 300c. The one or more processors 106 may be configured to determine the one or more gestures 300c of the one or more source objects within the plurality of reference images by determining whether the plurality of reference images include one or more known gesture patterns 302c indicative of the one or more gestures 300c. As shown in FIG. 3C, the one or more processors 106 may be configured to generate one or more digital gesture sequences. For example, the one or more digital gesture sequences may correspond to the movement of one or more portions of the one or more source objects. In this way, as shown in FIG. 3C, the one or more processors may be configured to generate a digital gesture sequence corresponding to arms and wands fully extended above the head of a body of the source object 116, where the wands are moved inwardly in a jabbing motion until the wands touch. The digital gesture sequence may be configured to indicate a velocity of movement of the one or more source objects 116.

Figure 3D:
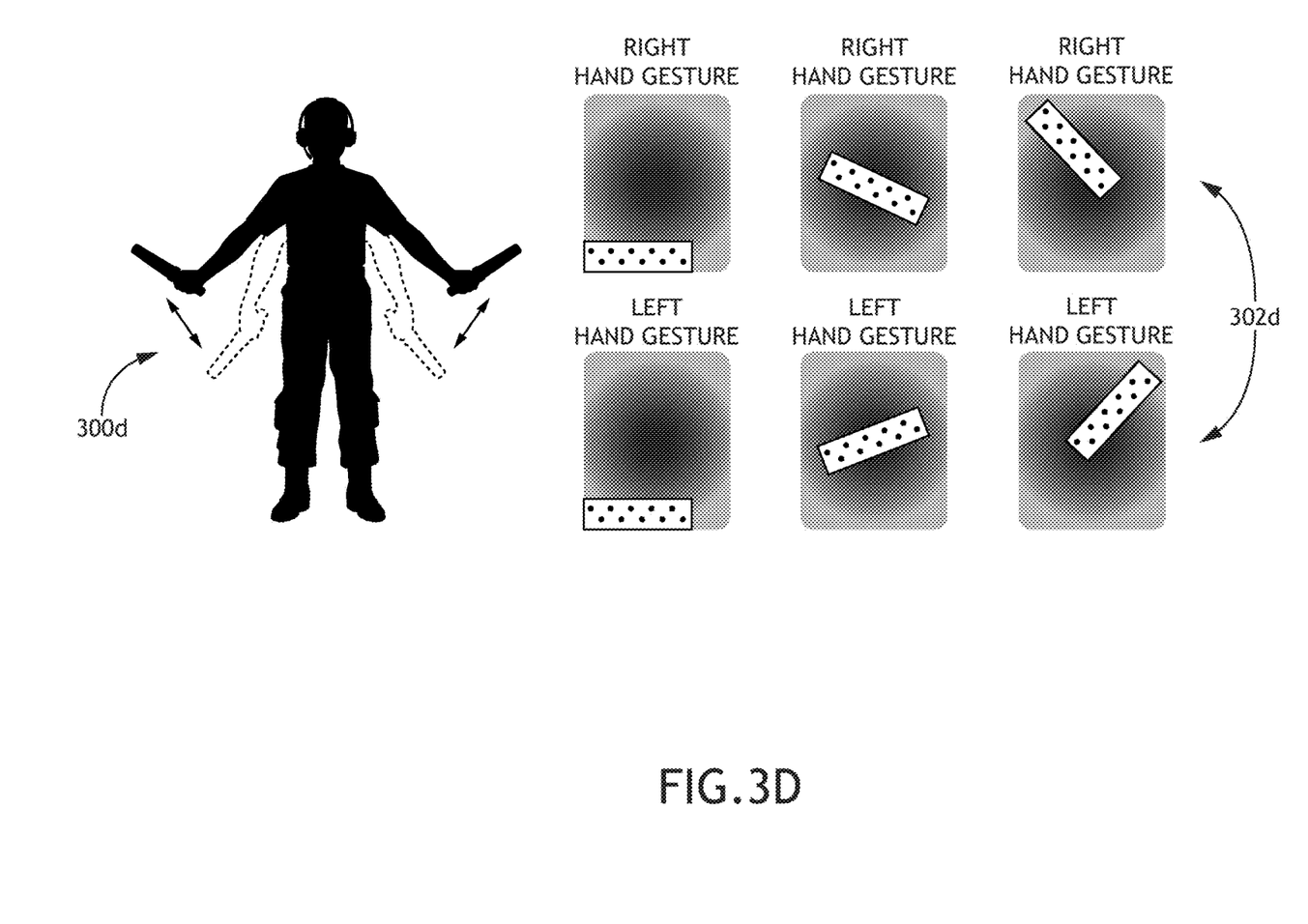
FIG. 3D illustrates a conceptual view of a hand gesture, in accordance with one or more embodiments of the present disclosure.

Referring to FIG. 3D, a gesture having a meaning to slow down is shown. The one or more source objects 116 may perform the one or more gestures 300d. The one or more processors 106 may be configured to determine the one or more gestures 300d of the one or more source objects within the plurality of reference images by determining whether the plurality of reference images include one or more known gesture patterns 302d indicative of the one or more gestures 300d. As shown in FIG. 3D, the one or more processors 106 may be configured to generate one or more digital gesture sequences. For example, the one or more digital gesture sequences may correspond to the movement of one or more portions of the one or more source objects. In this way, as shown in FIG. 3D, the one or more processors may be configured to generate a digital gesture sequence corresponding to arms extended, where the wands are moved downwardly in a patting motion from a waist of the body of the one or more source objects 116 to a knee of the body. The digital gesture sequence may be configured to indicate a velocity of movement of the one or more source objects 116.

Figure 3E:
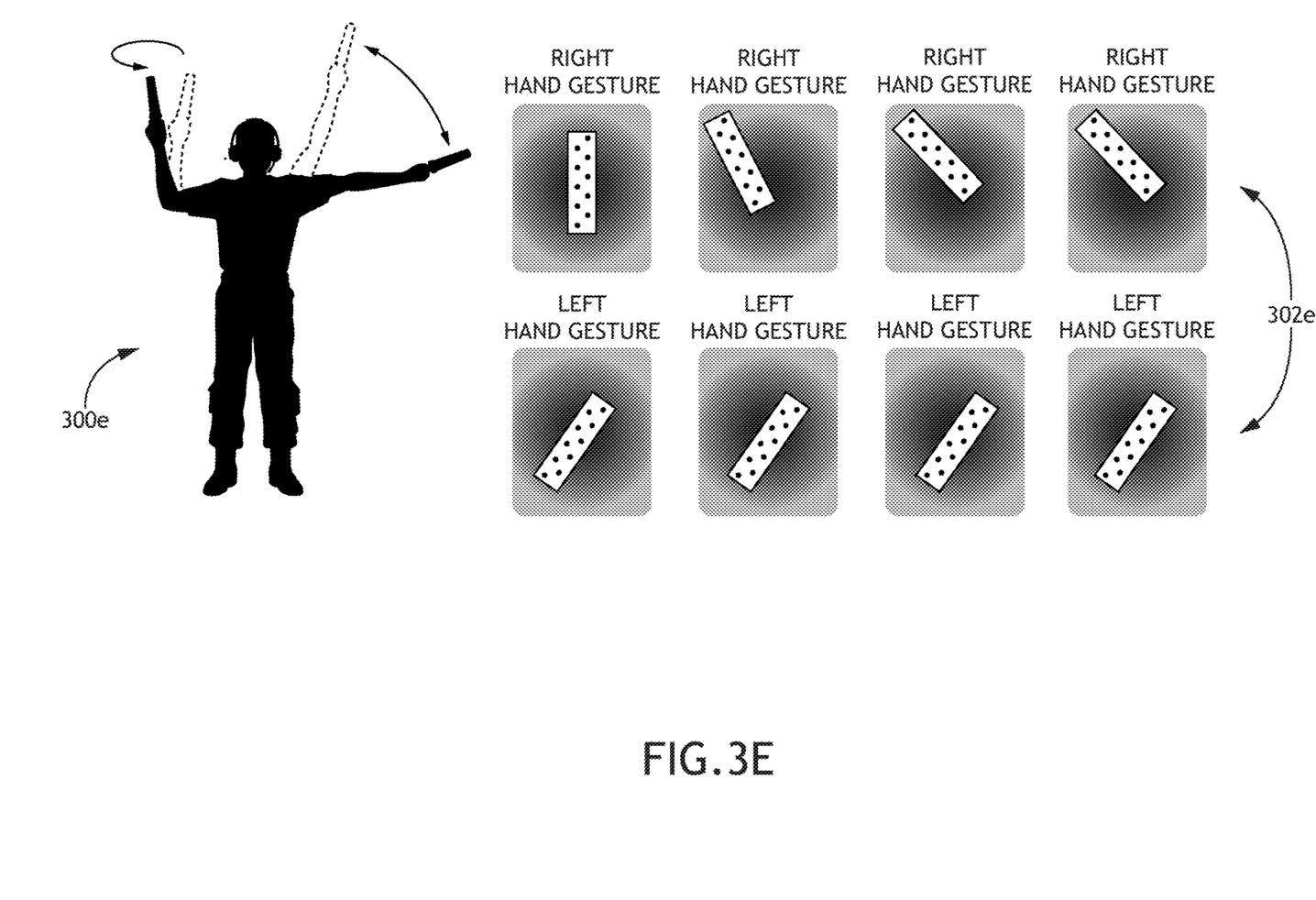
FIG. 3E illustrates a conceptual view of a hand gesture, in accordance with one or more embodiments of the present disclosure.

Referring to FIG. 3E, a gesture having a meaning to start one or more engines of the aircraft is shown. The one or more source objects 116 may perform the one or more gestures 300e. The one or more processors 106 may be configured to determine the one or more gestures 300e of the one or more source objects within the plurality of reference images by determining whether the plurality of reference images include one or more known gesture patterns 302e indicative of the one or more gestures 300e. As shown in FIG. 3E, the one or more processors 106 may be configured to generate one or more digital gesture sequences. For example, the one or more digital gesture sequences may correspond to the movement of one or more portions of the one or more source objects. In this way, as shown in FIG. 3E, the one or more processors may be configured to generate a digital gesture sequence corresponding to a right arm raised to head level, where a wand is pointed upwardly and moved in a circular motion, where a left arm is raised above the head level and pointed toward an engine to be started. The digital gesture sequence may be configured to indicate a velocity of movement of the one or more source objects 116.

Figure 3F:
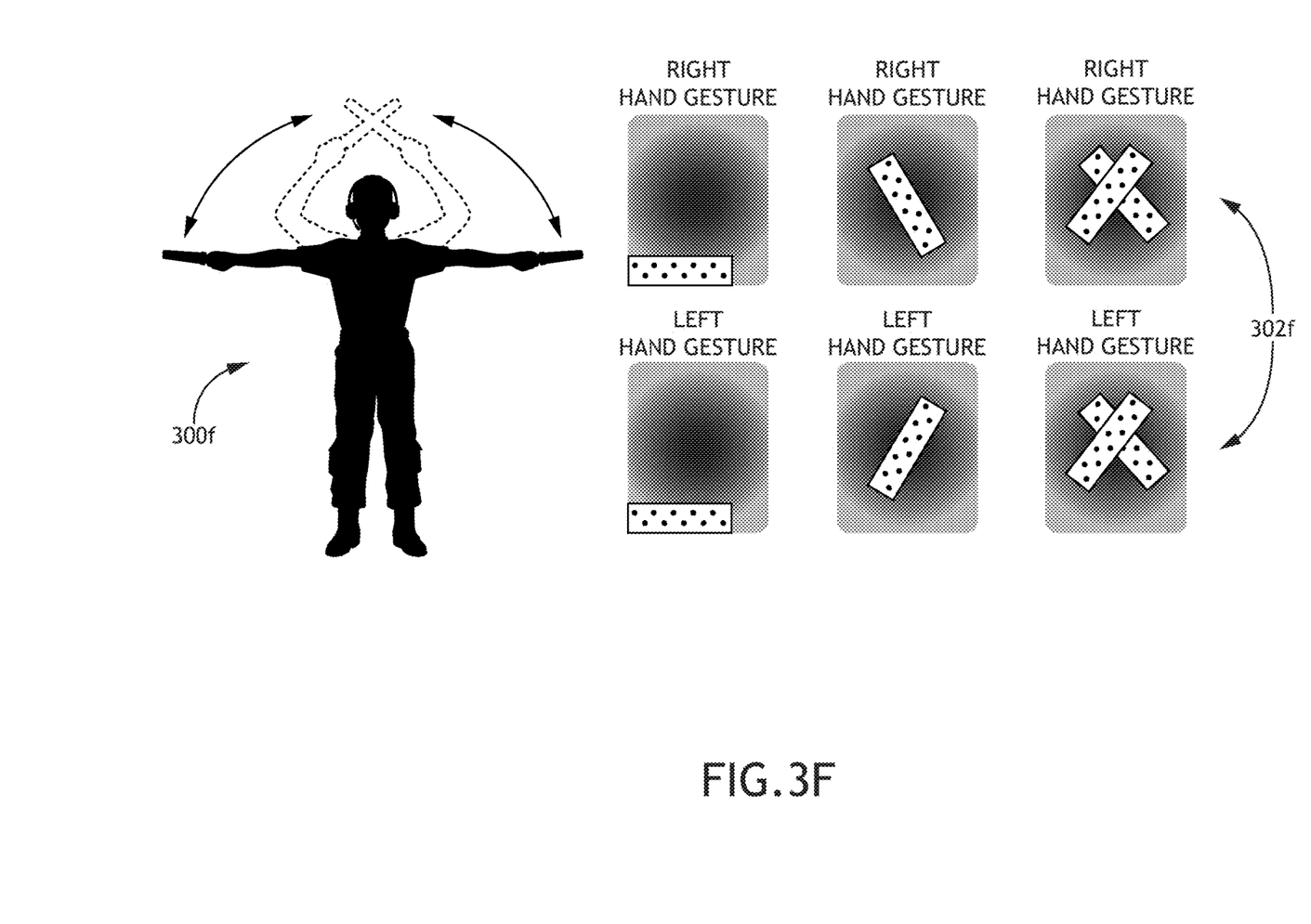
FIG. 3F illustrates a conceptual view of a hand gesture, in accordance with one or more embodiments of the present disclosure.

Referring to FIG. 3F, a gesture having a meaning to stop the aircraft is shown. The one or more source objects 116 may perform the one or more gestures 300f. The one or more processors 106 may be configured to determine the one or more gestures 300f of the one or more source objects within the plurality of reference images by determining whether the plurality of reference images include one or more known gesture patterns 302f indicative of the one or more gestures 300f. As shown in FIG. 3F, the one or more processors 106 may be configured to generate one or more digital gesture sequences. For example, the one or more digital gesture sequences may correspond to the movement of one or more portions of the one or more source objects. In this way, as shown in FIG. 3F, the one or more processors may be configured to generate a digital gesture sequence corresponding to arms fully extended, where wands are held at a 90-degree angle to the body and moved slowly in a parabolic motion until reaching a cross above the head. The digital gesture sequence may be configured to indicate a velocity of movement of the one or more source objects 116.

It is noted that the foregoing embodiments of the present disclosure are not limited to the settings, contexts, and applications in which they have been described. For example, the applications and examples of the present disclosure may be interchangeable between settings and contexts, and are provided merely for illustrative purposes.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

As described herein, memory may include any storage medium known in the art suitable for storing program instructions executable by the associated one or more processors 109. For example, the memory may include a non-transitory memory medium. For instance, the memory may include, but is not limited to, a read-only memory (ROM), a random-access memory (RAM), a magnetic or optical memory device (e.g., disk), a magnetic tape, a solid-state drive and the like. In another embodiment, the memory is configured to store data collected by the system 100. It is further noted that memory may be housed in a common controller housing with the one or more processors 106. In an alternative embodiment, the memory may be located remotely with respect to the physical location of the processors 106. In another embodiment, the memory maintains program instructions for causing the one or more processors 106 to carry out the various steps described through the present disclosure.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," "temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system, comprising:
    one or more source objects; wherein the one or more source objects comprise a first and second wand;
    an aircraft comprising a plurality of image capture devices; wherein the plurality of image capture devices are configured to capture a plurality of reference images; wherein the plurality of image capture devices comprise one or more right-side image capture devices coupled to a right-wing of the aircraft and one or more left-side image capture devices coupled to a left-wing of the aircraft; and
    a controller communicatively coupled to the plurality of image capture devices, wherein the controller includes one or more processors configured to execute a set of program instructions stored in one or more memory units, the set of program instructions configured to cause the one or more processors to:
        receive the plurality of reference images from the plurality of image capture devices;
        identify the one or more source objects within the plurality of reference images, wherein identifying the one or more source objects within the plurality of reference images comprises determining one or more source object characteristics of the one or more source objects within the plurality of reference images and determining the one or more source object characteristics match one or more expected source object characteristics, wherein the one or more source object characteristics comprises one or more distances between the plurality of image capture devices and the first and second wand, one or more dimensions of the first and second wand, a color of the first and second wand, and a movement of the first and second wand;
        determine one or more gestures of the one or more source objects based on the plurality of reference images, wherein the one or more gestures are indicative of one or more control signals of the one or more source objects;
        determine the one or more control signals based on the one or more gestures of the one or more source objects; wherein the one or more control signals include:
            one or more right-side control signals based on one or more gestures determined from right-side images captured by the one or more right-side image capture devices; and
            one or more left-side control signals based on one or more gestures determined from left-side images captured by the one or more left-side image capture devices;
        validate the one or more control signals by comparing the one or more right-side control signals to the one or more left-side control signals; wherein validating the one or more gestures comprises determining one or more contradictions between the one or more right-side control signals and the one or more left-side control signals; and
        provide the one or more control signals to the aircraft; wherein the one or more control signals comprise one or more signals configured to adjust one or more aspects of movement of the aircraft; wherein providing the one or more control signals comprises causing the aircraft to brake in response to determining the one or more contradictions between the one or more right-side control signals and the one or more left-side control signals.

2. The system of claim 1, wherein identifying the one or more source objects within the plurality of reference images comprises:
    disregarding one or more objects lacking the one or more source object characteristics within the plurality of reference images.

3. The system of claim 1, wherein determining one or more gestures of the one or more source objects wherein the one or more gestures are indicative of one or more control signals of the one or more source objects comprises:
    identifying one or more gesture patterns indicative of the one or more gestures; and
    determining the one or more gestures based on the one or more gesture patterns.

4. The system of claim 1, wherein providing the one or more control signals comprises:
    providing the one or more control signals to at least one of a user via one or more user interfaces or one or more flight systems of the aircraft.

5. The system of claim 4, wherein the one or more gestures comprise one or more visual hand movements configured to provide guidance to an operator of the aircraft for maneuvering one or more portions of the aircraft.

6. The system of claim 1, wherein the one or more aspects of movement of the aircraft comprise at least one of acceleration of the aircraft, direction of movement of the aircraft, starting of one or more engines of the aircraft, stopping of one or more engines of the aircraft, braking of the aircraft, or parking of the aircraft.

7. The system of claim 4, wherein the one or more user interfaces comprise at least one of a visual interface or an aural interface.

* * * * *